Jan. 7, 1936.  M. F. H. GOUVERNEUR  2,026,782
CLAY HOMOGENIZING METHOD AND APPARATUS
Filed April 3, 1931  2 Sheets-Sheet 1
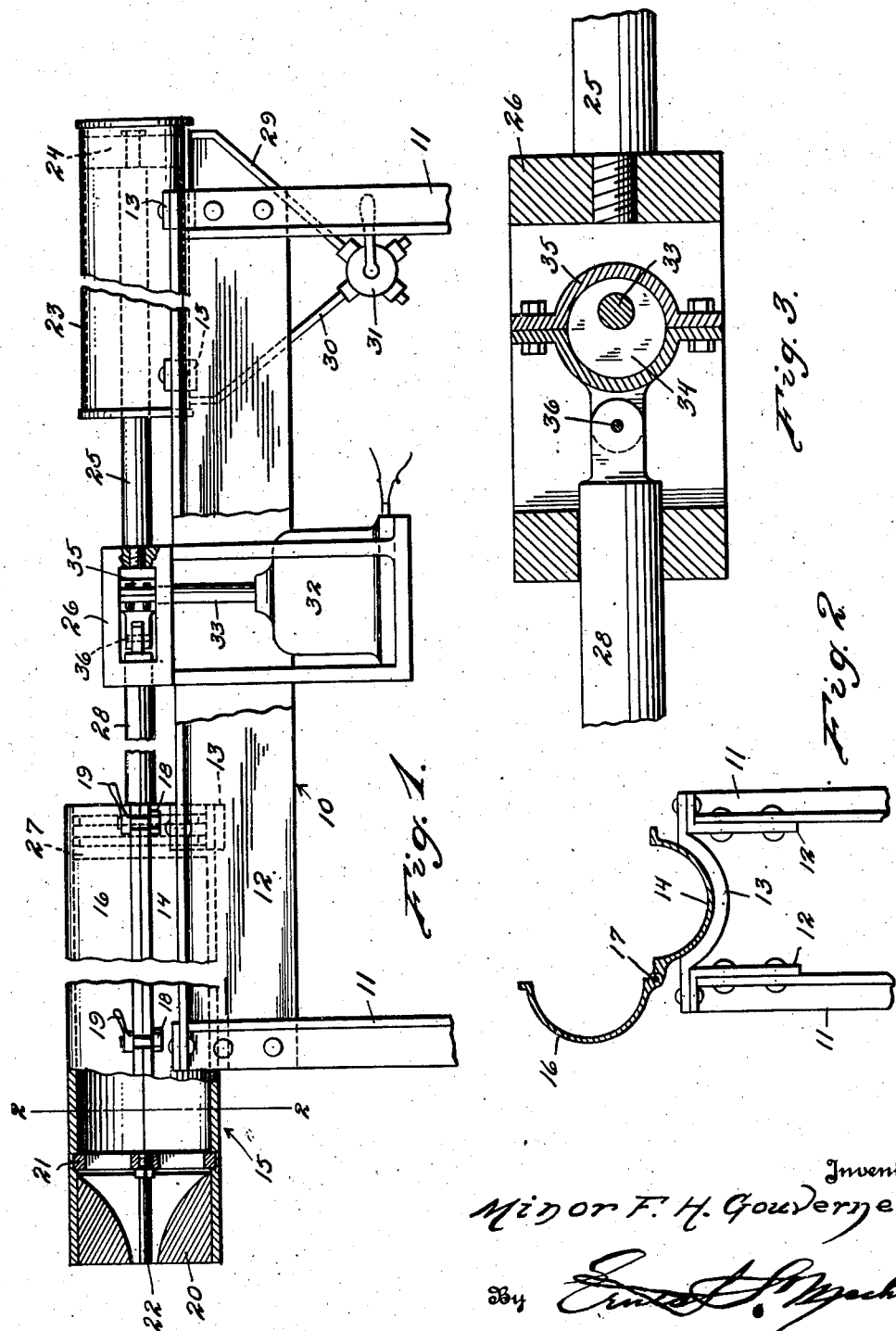

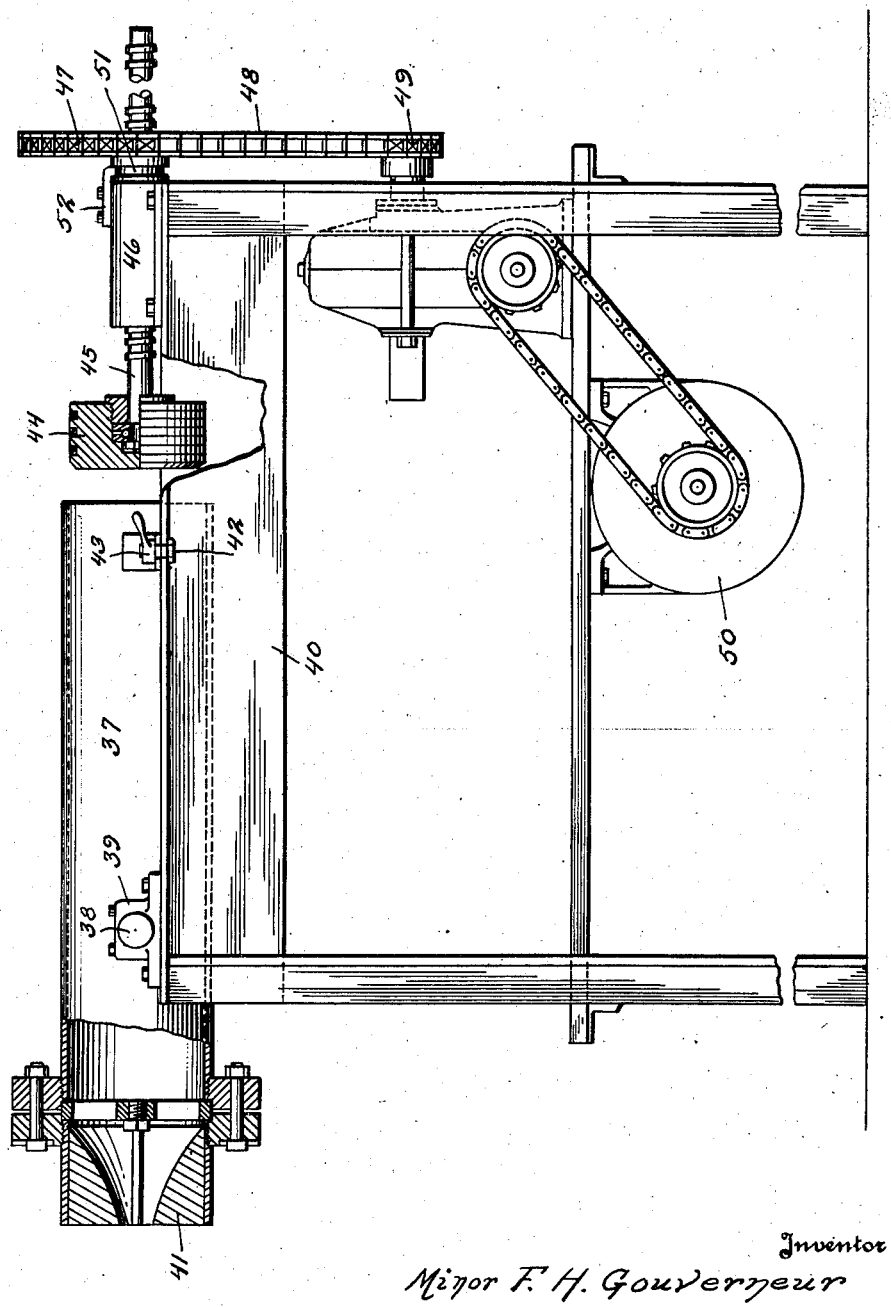

Patented Jan. 7, 1936

2,026,782

UNITED STATES PATENT OFFICE 2,026,782

CLAY HOMOGENIZING METHOD AND APPARATUS

Minor F. H. Gouverneur, Baltimore, Md., assignor to Locke Insulator Corporation, Baltimore, Md., a corporation of Maryland Application April 3, 1931, Serial No. 527,574

8 Claims. (Cl. 25—11)

The invention relates to the preparation of clay for the manufacture of ceramic ware, particularly, though not necessarily, porcelain insulators and has for its general object the provision of an apparatus which will render the clay homogeneous throughout by breaking up and eliminating any laminations resulting from treatment in the ordinary pug mill.

By way of explanation it might be well to state that in the making of ceramic ware kaolin, or a blend of different varieties thereof, together with felspar and possibly other ingredients, are ground and mixed with water to form a slip which may be lawned or otherwise treated so as to render it of uniform and proper consistency. This slip is then placed in filter presses where the undesirable amount or excess of water is removed. The cakes of plastic material taken from the filter press are then placed in a pug mill which is customarily provided interiorily with a rotating blade or blades of an auger or propeller-like form which break up and knead the clay which is afterwards forced out of the discharge nozzle of the pug mill ready for use. Particularly in the manufacture of large sizes of porcelain insulators it has been found that after shaping by plunging or any other well known means it frequently occurs that the insulator warps, cracks or discloses a cracking tendency during the preliminary drying stage or when fired in a kiln. By observation and experiment it has been found that this unfortunate situation arises as the result of the laminations made in the clay by the action of the blades of the pug mill. As a concrete instance of what happens, I have found that if a billet of clay from a pug mill be marked and then permitted to dry the mark shifts rotatably, thereby clearly indicating that the clay when drying becomes distorted in a direction corresponding to the rotative advance of the pug mill blades. In small pieces this distortional tendency may not have any particularly deleterious results but in the manufacture of the larger sizes of ware, particularly high tension insulators, the condition is serious not only as it causes a high percentage of loss of insulators during the drying and firing operations but, worse still, as it causes internal strains to be set up in the finished porcelain, which strains may not be visible but may cause failure of the insulator after it is installed in service.

During the course of a long series of experiments I have found that by subjecting the clay to rapid vibration, after it leaves the pug mill, the molecular structure thereof is reorganized and the particles thereof become so arranged and united that the whole structure is homogeneous and evinces no laminational tendencies.

I am aware that it is not broadly new to subject porcelain clay to vibration simultaneously with the application of pressure thereto in the molding of insulators as this idea is disclosed for example in Patent No. 1,717,996 granted June 18th, 1929 to Stewart L. Moore, Jr. However, it is the principal object of the present invention to vibrate the clay by appropriate means subsequent to its extrusion from a pug mill and prior to its shaping into any object.

Another object of the invention is to provide an apparatus for carrying out the broad method.

A more specific object of the invention is to provide an apparatus by means of which clay is continuously vibrated while subjected to extrusive pressure so that the clay will be thoroughly compacted, any air pockets eliminated, and the entire mass made cohesive and homogeneous throughout.

Another object of the invention is to provide an apparatus in which the treatment of the clay may be carried out continuously and rapidly so that the cost of production of the ceramic ware will not be materially increased.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation, with parts broken away and other parts in section, showing a practical embodiment of the inventive concept, Figure 2 is a cross sectional view taken on the line 2—2 of Figure 1, Figure 3 is a detail sectional view, Figure 4 is a view similar to Figure 1 showing a modification.

Referring more particularly to the drawings and especially Figures 1 to 3, I have shown an appropriate apparatus or machine for carrying out my method. This machine is represented as comprising a suitable stationary supporting frame 10 composed of any necessary number of parts secured together in any desired manner but shown, for the sake of clearness, as including legs 11, longitudinal supporting bars 12 and transverse curved cradle elements 13, the latter supporting the lower half 14 of a barrel or cylinder 15. This barrel has its top half 16 hinged as at 17 to permit charging with a billet or mass of clay to be treated. Means such as the bolts with their lever nuts shown at 18 and 19 respectively is provided for normally holding the halves of the barrel together. At its outer end the barrel is provided with a discharge nozzle 20, the specific construction of which depends upon the desired size and shape of the column to be extruded from the barrel. In the present instance there is also shown a spider 21 located within the barrel and carrying a pin or spindle 22 located centrally of the nozzle so that the extruded column will be of tubular form. Obviously, if a solid column is desired the spindle and its supporting spider are omitted.

Mounted on the other end of the support is a cylinder 23 within which lies the piston 24 mounted on a piston rod 25 which is secured to a frame 26. Operating within the barrel 15 is a suitably packed piston 27 carried by a piston rod 28 arranged in alinement with the piston rod 25 and slidable in the frame 26. The cylinder 23 is provided at its ends with pipes 29 and 30 leading to a control valve 31 which may be of the conventional three-way type and which is interposed in a fluid pressure conducting line so that compressed air, water under pressure or steam may be admitted to the desired end of the cylinder 23 so as to react with the piston 24 for moving the piston rod 25, frame 26, piston rod 28 and piston 27 in the desired direction. Details of the valve are not given as there is nothing distinctive about it. It is of course understood though that when fluid pressure is admitted to the pipe 29 or 30, as the case may be, the other constitutes the discharge pipe, the actual exhaust taking place through the valve.

The vibration producing means is shown as comprising a suitable electric motor 32 mounted in the frame 26 and having an upstanding shaft 33 equipped with an eccentric 34 located within an eccentric strap 35 pivoted at 36 to the inner end of the piston rod 28. It will be seen that as this mechanism is all mounted within the frame 26 it moves with it as the frame is advanced by the movement of the piston in the cylinder 23.

In the operation, the upper half 16 of the barrel 15 is swung open and the billet or other mass of clay to be treated is placed within the barrel. The hinged top is then closed and secured by the bolts and nuts 18 and 19. Naturally this is all done while the pistons 24 and 27 are in their retracted position. Fluid pressure is then admitted through the pipe 29 to advance both pistons so that the clay within the barrel 15 will be extruded through the discharge nozzle 20. At the same time current is supplied to the electric motor whereupon the resultant rotation of the eccentric 34 will impart a rapid reciprocatory movement to the piston rod 28 and piston 27. The exact frequency of this vibration is a detail which may be determined by experimentation but it is preferable that it be high. It is this vibration applied to the clay which accomplishes the desired beneficial results. Clearly as the piston 27 vibrates it exerts alternate pushing and pulling pressure upon the clay mass and tends to compact and stretch it in rapid sequence. The effect upon the clay is more than a mere tamping and kneading and may conveniently be described as a "molecular kneading" inasmuch as specimens of clay extruded from the machine and carefully tested show a total absence of the objectionable laminations which are present in the billet or mass placed in the barrel for treatment.

After a charge of clay has been extruded from the machine, the control valve is manipulated to introduce fluid pressure through the pipe 30 for returning both pistons to retracted position, after which the barrel is again filled. As the various necessary steps require but little time the entire action is very rapid and the treatment will therefore not add materially to the cost of production of whatever ceramic ware is made from the clay.

In Figure 4 there is illustrated a modification in which the barrel is differently mounted and in which the vibration is brought about indirectly. In this form I have shown a barrel 37 which is a continuous cylinder instead of embodying hinged parts as in the first form. This barrel has lateral trunnions 38 journaled in bearings 39 on a suitable supporting stand 40. The outer end of the barrel is provided with a discharge nozzle 41 which may correspond with that shown in the first form. Charging of this barrel with clay is effected from the inner end, the idea being that upon releasing a bolt 42 and nut 43 thereon the barrel may be swung upon its trunnions 38 into a substantially vertical position in which it will of course be a simple matter to pack it with a mass of clay.

The pressure applying means is represented as comprising a suitably packed piston 44 swiveled upon one end of a screw 45 which passes through a suitable bearing 46 and which carries a sprocket nut 47 driven by a chain 48 engaged about a sprocket 49 which may be operated through any suitable transmission gearing, not shown, driven by an electric motor 50 mounted on the frame 40. As the sprocket nut 47 must be restrained against any movement other than rotary I have shown it as carrying a grooved collar 51 engaged by a bracket 52 on the bearing 46.

In the use of this modification, it will be seen that clay placed within the barrel 37 will be extruded through the nozzle when the piston 44 is advanced by rotating the sprocket nut 47. While no positive means is provided in this instance for directly vibrating the piston 44, it is clear that there will be sufficient vibration of all the parts when the motor 50 is running that the clay will be subjected to the desired "molecular kneading", though naturally to not as great an extent as in the preferred form of the invention above described.

From the foregoing description and a study of the drawings it is thought that the construction, operation and advantages of both forms of the invention will be readily understood by one skilled in the art without further explanation.

While I have shown and described the preferred embodiments of the invention, it should be understood that the disclosure is merely an exemplification of the principles involved as the right is reserved to make all such changes in the details of construction as will widen the field of utility and increase the adaptabilty of the device provided such changes constitute no departure from the spirit of the invention or the scope of the claims hereunto appended.

Having thus described the invention, I claim:

1. The method of conditioning clay for the production of ceramic ware comprising extruding it under pressure and simultaneously subjecting it to vibration in the direction of extrusions.

2. A clay conditioning apparatus comprising a support, a barrel thereon having a discharge nozzle and a piston, means for advancing the piston, and means for applying vibration thereto in the direction of movement of the piston.

3. In a clay extruding device, means for applying rapid vibration thereto in the direction of extrusion only.

4. In an apparatus of the character described embodying a barrel having a discharge nozzle and containing a reciprocatory piston, means for moving the piston, and other means for vibrating the same.

5. In an apparatus of the character described embodying a barrel having a discharge nozzle and containing a reciprocatory piston, means for moving the piston at a relatively low speed, and other means for rapidly reciprocating the piston.

6. In an apparatus of the character described, a barrel adapted to receive a charge of plastic clay and provided at one end with a discharge nozzle, a piston operating within the other end of the barrel for applying pressure to the clay, a piston rod carrying said piston, means for moving said rod longitudinally, and means interposed in said rod for imparting rapid vibratory movement thereto whereby the vibration will be imparted to the clay.

7. In an apparatus of the character described, a barrel adapted to contain plastic clay and provided with a discharge nozzle, a piston operating within said barrel, a piston rod, means connected with the piston rod for advancing the piston, a frame depending from the piston rod, and means carried by said frame and interposed in the piston rod for imparting vibratory movement to the latter.

8. In a machine of the character described, a support, a barrel mounted thereon and adapted to receive a charge of plastic clay, a discharge nozzle at one end of the barrel, a piston within the other end of the barrel having a piston rod, a second rod arranged in axial relation to said piston rod, means for moving the second named rod, a frame depending from said second named rod, said first named rod being slidable with respect to said frame, a driven shaft journaled in said frame, and eccentric means carried by said shaft and cooperating with the piston rod for imparting vibratory movement thereto.

MINOR F. H. GOUVERNEUR.